Dec. 26, 1967          R. PITTMAN          3,359,806

RATE SENSOR

Filed May 3, 1965

INVENTOR
ROLAND PITTMAN

ATTORNEY

United States Patent Office

3,359,806
Patented Dec. 26, 1967

3,359,806
RATE SENSOR
Roland Pittman, Grand Rapids, Mich., assignor, by mesne assignments, to Northrop Corporation, Palos Verdes, Calif., a corporation of California
Filed May 3, 1965, Ser. No. 452,703
13 Claims. (Cl. 74—5.6)

This invention relates to a gyroscopic instrument for sensing the rate of angular displacement of a moving body to which the apparatus is secured, sometimes termed a "rate sensor" or "rate gyro."

It is well-known that if a gyroscopic rotor is rotatably supported on a gimbal and the gimbal is resiliently restrained with reference to a fixed framework then, with the rotor spinning at some selected angular velocity, any displacement of the framework from a predetermined, fixed reference, usually taken as the spin axis of the rotor, will precess the gimbal at a rate which is dependent on the resilient restraint. By means of a suitable pickoff, the rate of displacement of the gimbal may be translated into an electrical signal which may be used for indication or control.

It is also known that the rotor of a rate gyro may comprise a mass of fluid contained in a suitable chamber and that, when the chamber is brought up to some predetermined speed, the fluid will acquire the same speed. A rate gyro so characterized is sometimes referred to as being "gimbal-free." By utilizing a fluid of substantial density, e.g., mercury, the angular momentum required to provide gyroscopic behavior may be readily realized. An instrument so characterized will respond to a force vector which is the resultant of displacement referred to two axes at right angles to the spin axis. For disclosures of apparatus of the foregoing character reference is made, for example, to U.S. patents, No. 3,058,359, to Willis G. Wing, dated Oct. 16, 1962, and No. 3,142,991 to the applicant herein, dated Aug. 4, 1964.

By utilizing a dense fluid as the rotating mass detection of precession may be accomplished by the use of a transducer including an element immersed in the fluid so as to be subject to displacement of the fluid rotor and causing such displacement to provide an electrical signal, e.g., by means of a piezoelectric crystal or crystals connected to a resolver forming part of an electric circuit. Thus, pressure or bending applied to the crystal will generate an electrical voltage to perform, through a resolver, some useful function such as control of yaw in an aircraft, space vehicle or the like.

Actually, the fluid rotor remains fixed in space due to its gyroscopic rigidity, while the enclosure defining the chamber moves about it and, since the sensing means is fixed to the enclosure, relative displacement between the fluid and enclosure affects the sensing means.

The present invention relates to improvements in fluid rotor rate gyroscopes functioning in accordance with the foregoing principles. However, it will become evident from what follows that the gist of the invention may be incorporated in gyroscopes employed to sense absolute angular displacement as well as rate of displacement, of the rotor axis.

The principal object of the invention resides in providing improved mounting of the transducer in a fluid rotor gyroscope, for example, one employing piezoelectric means to generate a voltage which is fed to a resolver capable of providing an output proportional to the magnitude and phase of the displacing vector. In this connection, it will be understood that, since the transducer, e.g., one including crystals and means to apply force thereto, rotates with the enclosure, the same desirably comprises a balanced system of two or more equally spaced crystals which, together with the supporting means therefor, is readily capable of being dynamically balanced with respect to the axis of rotation. However, one crystal may be used provided that balance is properly achieved.

Another object is to provide supporting means for the transducer which is so constituted as to introduce minimum friction relative to the fluid mass in order that the dynamic behavior of the fluid rotor may not be materially disturbed, whereby spurious sensing of displacement may result.

A further object is to provide supporting means as aforesaid wherein certain parts thereof may be tubular for passage of electrical leads therethrough whereby such leads are protected against damage by the fluid mass as the same is accelerated from standstill to its running speed.

Still another object is to provide transducer means including bender-type bimorph crystals which are mounted at their base in cantilever fashion whereby the crystals may be of some transverse cross section calculated to yield maximum electrical output over the entire range of bending, and to connect said crystals at their distal end to means affording an extended area of physical contact with the fluid rotor. Thus, the force applied to the crystals is amplified to provide a substantially greater response than would be the case if direct action of the fluid on the crystals were to be relied on.

Another object is to provide a sensing and voltage generating transducer in conjunction with a fluid rotor so constructed and arranged as to be immune to a greater degree, than has heretofore been possible, to the effects of vibration, whether such vibration is inherent in the instrument or due to the exterior support upon which the same is mounted.

Another object is to provide a fluid-rotor gyro in which the transducer assembly immersed in the fluid is fully floated, whereby to exhibit environmental capacity superior to prior known instruments.

A further object resides in providing a fluid rotor rate gyro in which "caging" due to the interaction of structural parts within the fluid mass with such mass are reduced to an acceptable minimum.

Additional objects reside in the provision of an instrument of the type mentioned which has extremely wide dynamic range, excellent frequency response, high "G" capacity and a very low threshold.

Other objects and advantages of the invention will become apparent from the ensuing description which, taken with the accompanying drawings, discloses a preferred form in which the invention may be embodied in practice.

Figure 1:
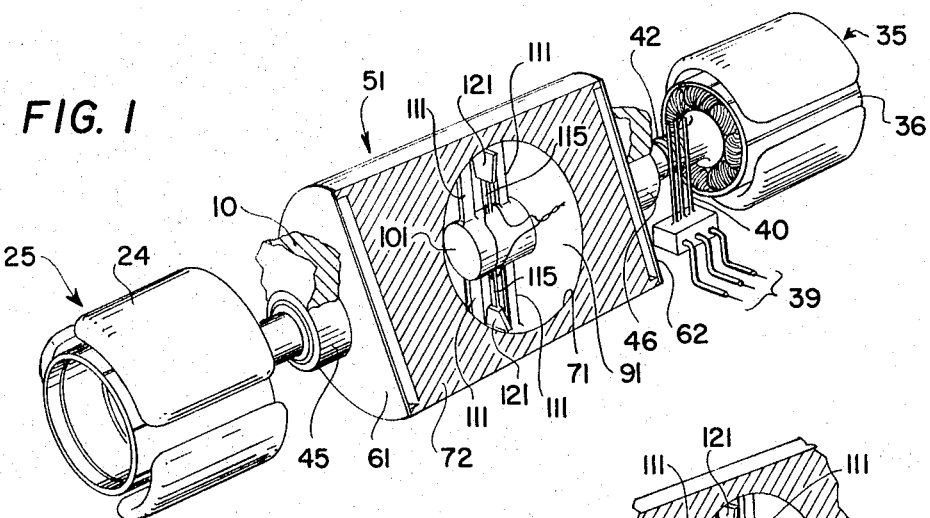
FIG. 1 is a schematic perspective view, partly in cross section, of a rate gyro embodying the principles of the invention.

Regarded broadly, the invention resides in a rate gyro of the fluid rotor type, capable of sensing angular rate applied on two axes, in which the transducing means for sensing relative displacement of the fluid rotor with respect to its enclosure and the support therefor are so constructed and arranged as to be relatively insensitive to the effects of caging of the fluid, gravity, shock and vibration. Since the requirements for the fluid include high density, low viscosity, low vapor pressure, low freezing point and a relatively high boiling point, mercury with an additive, say thallium, has been found ideally suited. Precession of the fluid rotor mass is sensed by suitable probes immersed in the fluod, for example, diametrically-oppositely positioned paddle-shaped members presenting an area which is extended relative to the voltage-generating crystals disclosed by way of example. Such area is preferably disposed in a plane normal to the spin axis. It must be noted that the fluid rotor does not have the equivalent of a precission axis but, for purposes of exposition, it will be assumed that, in the absence of a displacing force and with the rotor at normal speed, such axis coincides with the spin axis of the enclosure defining the fluid-containing chamber. Under such assumed conditions, the paddles will be undeflected and the active surface thereof will be disposed essentially in the equatorial plane. Each paddle is arranged to stress respective voltage-generating elements such as piezoelectric crystals, preferably a pair of radially-opposite bender bi-morph crystals mounted on a suitable central support with the basal end thereof rigid and the distal end secured to a respective paddle. To obtain balanced response, one may employ, instead of separate crystals, a single, elongated crystal with a central region fixed. Thus, expensive matching or calibration is avoided. Accordingly, upon displacement of the framework which, it will be understood, is affixed to the vehicle, the fluid mass exerts force on the paddles with consequent bending of the crystals and the generation thereby of a signal which is availed of for some control function. The invention is not concerned with the employment per se of the thus-generated signal since various well-known expedients may be employed for that purpose. Suffice it to say that the voltage derived from the crystals is fed through slip-rings and brushes or equivalent means to a resolver so constructed and arranged as to provide information on the rate of application of the resultant vector of displacing force and its polar position with reference to an established zero reference. Inasmuch as the paddles remain circumferentially fixed in the fluid-containing chamber, the fluid, upon precession, will react against the paddles which are thereby caused to undergo a substantially harmonic displacement. The sinuosidal representation of such displacement will have an amplitude representative of the displacement of the fluid rotor mass from a null axis and a phase relative to a zero position. For a more complete elucidation of the foregoing, reference is made to United States Letters Patent No. 3,058,359, granted Oct. 16, 1962 to Willis G. Wing, and No. 3,142,991, granted Aug. 4, 1964, to this applicant.

A paramount feature of the instant concept resides in the arrangement for supporting the transducing means which senses displacement of the fluid rotor and converts such displacement into an electrical signal. To this end, the crystals, for example, are secured by one end to a central support, desirably having a streamline exterior configuration referred to the direction of movement of the rotor relative thereto. Thus the effects of caging and turbulence are substantially minimized. The paddles, desirably annular segments, are affixed to the distal end of respective bender bi-morph piezoelectric crystals. The central support is rigidly supported on the fluid-containing enclosure by rigid members disposed radially with respect to the spin axis. Through this expedient, caging of the fluid is materially reduced and the effects of vibration in the direction of the spin axis on the response of the sensing means thereby rendered substantially ineffective. Furthermore, the central support is of some material having a much lower density than the fluid, e.g., steel versus mercury, so that the support "floats." Accordingly, susceptibility of the device to forces applied rectilinearly is reduced to virtually zero. It is desirable to shock-mount the transducer assembly by securing the distal ends of the radial support members to resilient means, e.g., relatively thin, resilient laminae which are, in turn, attached to the enclosure. Thus, the effects of vibration in, or parallel to, the plane of the paddles may be rendered negligible.

Commercial embodiments of the invention have been fabricated in smaller than sub-miniature configurations, for example, in cylindrical capsule form only 0.700" diameter and 2" long.

Adverting to the drawings, FIG. 1 shows, somewhat schematically, an instrument which comprises a frame 10 upon which is mounted the stator 24 of the driving motor 25, this stator comprising coils wound on a suitable core. Inasmuch as the driving motor may take various forms well known in this art, further details are deemed unnecessary.

Furthermore, the resolver may take any of various well-known forms and, in the example, includes a stator 35 co-operative with an armature 36. The stator 35 is supported on the frame 10 with the several leads from the crystals being brought out to the resolver windings through terminals 39 leading from brushes 40 carried on the fram, and co-operative with slip-rings 42 carried on the rotatable assembly to be described. This latter is rotatably supported on anti-friction bearings 45 and 46, one race of which is mounted in the frame 10.

The rotatable assembly 51 comprises a pair of thin resilient discs 61 and 62, for a purpose to be detailed, which are secured to the ends of an enclosure 72. Each of the discs 61 and 62 has a hub received in the other race of respective ones of the bearings 45 and 46, whereby the rotatable assembly is supported for rotation. A spherical chamber 71 is formed in the enclosure 72.

Damped support for the enclosure 72 and the several components carried thereby is provided by the resilient discs 61 and 62. In order to enhance the flexibility of the discs 61 and 62 to enable the same to absorb axial vibration, the same may be weakened as by a plurality of apertures (not shown), or otherwise rendered sufficiently resilient for their proper function. In any case, the discs 61 and 62 are so constructed as to be anti-resonant at any frequency likely to be encountered by, or within the instrument, as will be understood.

Figure 5:
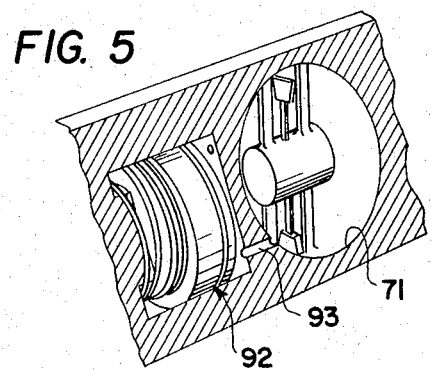
FIG. 5 is similar to FIG. 4 except that means to accommodate expansion of the fluid mass has been added.

The chamber 71 is filled with mercury together with a suitable additive to provide a fluid rotor 91 of high density, low viscosity, low vapor pressure, low freezing point and a relatively high boiling point. A suitable additive is thallium. In order not to obscure depiction of the parts which are immersed in the fluid, this latter is depicted as a small cross-hatched area. However it will be understood that the fluid fills the chamber. Means are desirably provided to accommodate expansion and contraction of the fluid under varying temperature. Such means may, for example, be a dashpot 92 (FIG. 5) carried on the enclosure 72, the cylinder of which is in communication with the chamber 71 through a port 93.

The sensing and signal-generating sub-assembly will now be described. A member 101, e.g., in the form of a cylinder 101 (FIG. 1) or a sphere 102 (FIG. 2) is mounted centrally of the chamber 71. Although a cylinder and a sphere have been shown exemplificatively, any equivalent streamline exterior surface may be used, and such surface will sometimes be referred to as a surface of revolution, the axis of which is the polar axis of the fluid-containing chamber. To obtain optimum flotation thereof in the fluid 91, the support member is of metal of density approximating the density of the fluid as closely as possible, e.g., tungsten.

Rigid support for the central support member 101 and 102 and the crystals and paddles mounted thereon, is provided by radially disposed struts 111, in the example, two opposed pairs secured at the basal end in the members 101 or 102, as the case may be, and to the wall of the chamber 71, at the distal end. If desired, the struts 111 may be hollow, as at 111a (FIG. 4) in order to receive and protect the electrical leads from the crystals in their transit to the exterior of the enclosure 71.

Figure 4:
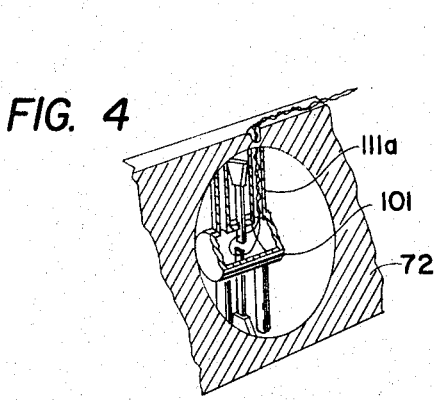
FIG. 4 is similar to FIG. 3 to illustrate a modification thereof.

The crystals 115 are preferably a single piezoelectric bender bi-morph crystal bar capable of generating a voltage when bent transversely of its axis. The crystal is covered with a conductive coating except for a short section mid-way of its length whereby to electrically separate the two outer portions, and is rigidly secured in its central region to the member 101 or 102, as the case may be. At each end of the crystal bar there is secured a paddle member 121, desirably an annular segment, of tungsten or tungsten alloy for optimum flotation with respect to the fluid 91, for the reason previously mentioned. Each paddle has a hole to receive the corresponding cross section of the crystal, e.g., rectangular. To avoid forcing the crystal, such fit is reasonably loose and the slack is filled with a potting compound. Furthermore, any exposed faces of the crystal are coated with a suitable dielectric to obviate short circuiting thereof by the fluid 91. The leads from the opposite faces of the two working parts of the crystal are taken out through suitable passages in the enclosure 72 to the slip-rings 42. As shown in FIG. 4 the support member 101, for example, may be suitably apertured to communicate with the hollow struts 111a, the leads threaded therethrough and thence through the enclosure 72 to the slip-rings 42. It will be understood that these leads are carried to the stator windings of the resolver 35, and that the circumferential relation between the windings of the resolver and the longitudinal axis of the crystal is adjusted to provide proper indication of the resultant vector of angular displacement of the rotor axis, i.e., phase relation.

The spacing between the paddles 121 and struts 111 in a polar direction is so determined as to permit the full expected displacement of the paddles but, if there is some misbehavior of the instrument, the struts can act as limit stops whereby to avoid damage to the crystal.

Figures 2, 3:
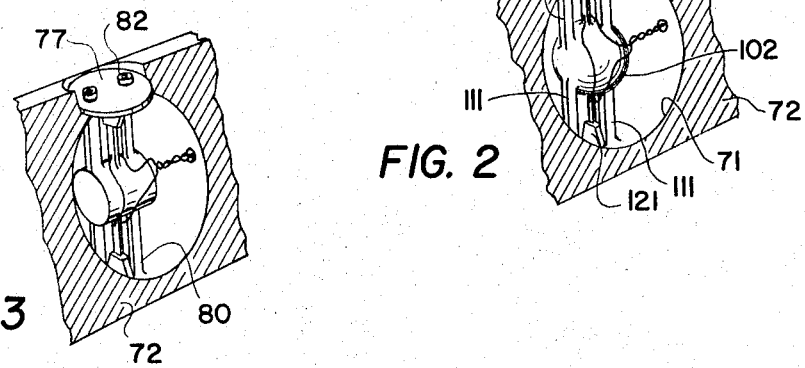
FIG. 2 is a partial view illustrating a portion of FIG. 1, but modified in certain respects.
FIG. 3 is a partial view of a portion of FIG. 1, showing a further modification.

Referring to FIG. 3, there is shown a modification in which means are included to provide for absorption of vibration at right angles to the spin axis. In this case a pair of thin, resilient laminae 77 (one being visible in the figure) are positioned diametrically opposite one another on the enclosure 72, and are secured thereto in any suitable manner. The enclosure is apertured, as at 80, and each pair of struts 111 or 111a is extended therethrough and secured, as at 82, to a respective laminae 77. Thus the entire assembly carried by the struts, as well as the struts themselves, are shockmounted. It will be understood that the design of the laminae 77 will be such that lateral vibration and shock are adequately accommodated and that the natural frequency thereof will be above any frequency normally present in the device or its environment. In the foregoing connection it will be understood that the vibration and shock intended to be absorbed by the laminae will, in general, be of low frequency compared to any steady state frequency which may be present.

Figure 6:
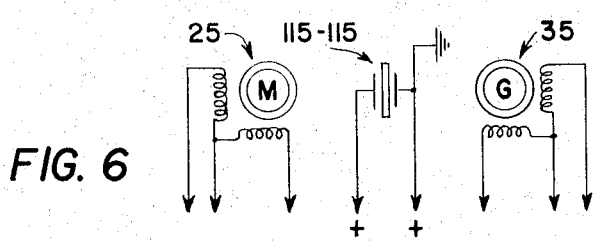
FIG. 6 is a diagram to show typical electrical circuitry.

FIG. 6 is a schematic showing of the basic circuitry associated with the invention instrument. The driving motor 25 and resolver 35 may assume any of the well-known forms. The crystal which, in the example, is a single, bender bi-morph is shown as having a ground common to the two active ends thereof and "plus" connections for each of said ends. However, it will be understood that two separate crystals may be employed provided that the same are adequately matched or calibrated.

From the foregoing it will have become evident that the invention instrument provides performance superior to prior instruments known to me, principally in the avoidance of spurious effects due to caging and lack of rigidity in the mounting of the sensing and signal generating means.

By reason of the dashpot 92 or equivalent means, the fluid chamber 71 may be completely filled to result in improved performance, even in a vibratory environment, as well improved resistance to impact. As referred to the axis of spin the central support 101, being symmetrical about an axis which corresponds essentially with the principal axis of the fluid mass, is to be contrasted with prior supports which were without such symmetry. Moreover, by utilizing struts of minimal cross section only a negligible surface area is presented to the fluid mass while providing adequate rigidity of the parts carried thereby.

I claim:

1. A rate gyro comprising a frame, an enclosure rotatably supported on said frame, said enclosure having a spherical chamber therein, the polar axis of the chamber being coincident with the axis of rotation, a dense fluid filling the chamber to constitute a rotor for the gyro, means to rotate said enclosure and, through viscous drag at the interface between the fluid and wall of the chamber, to rotate the rotor, means to sense displacement of the rotor due to displacement of the frame, said sensing means comprising a member immersed in the fluid, means to support said member comprising a strut positioned normally to said axis substantially along an equatorial diameter of the chamber and carried on the wall of the chamber, and means coactive with said member actuatable by said member upon movement thereof by the displaced fluid to generate a voltage, and a resolver to measure the magnitude of said voltage and the phase thereof relative to a fixed reference.

2. A rate gyro comprising a frame, an enclosure rotatably supported on said frame, said enclosure having a spherical chamber therein, the polar axis of the chamber being coincident with the axis of rotation, a dense fluid filling the chamber to constitute a rotor for the gyro, means to rotate said enclosure and, through viscous drag at the interface between the fluid and the wall of the chamber, to rotate the rotor, means to sense displacement of the rotor due to displacement of the frame, said sensing means comprising a pair of radially opposite paddles immersed in the fluid, means to translate displacement of the paddles into a voltage comprising an elongated piezoelectric crystal positioned with its longitudinal axis along an equatorial diameter of the chamber, said paddles being respectively secured to the distal ends of the crystal, and means to support said crystal comprising a rigid structure secured to the enclosure spanning said chamber from one side of the equator thereof to the opposite side, and means to receive said voltage and resolve the same into an electrical signal representative of the magnitude and phase thereof.

3. The combination in accordance with claim 2 wherein said structure comprises two opposite pairs of struts, a support at the center of the chamber, the inward ends of the struts being secured to said support and the members of each pair being disposed at each side of respective ones of said paddles.

4. The combination in accordance with claim 3 wherein said support has an exterior surface which is a surface of revolution, the axis of symmetry of which is the polar axis of the chamber.

5. The combination in accordance with claim 4 in which the surface is a cylindrical surface.

6. The combination in accordance with claim 4 in which said surface is a spherical surface.

7. The combination in accordance with claim 3 in which the support comprises material of substantially the same density as the fluid.

8. The combination in accordance with claim 3 in which the struts are tubular to provide passage for electrical leads from the crystal to the exterior of the enclosure.

9. The combination in accordance with claim 3 wherein each of the pair of struts associated with each paddle is so positioned as to provide a limit stop restricting displacement of the paddles to a safe value.

10. A rate gyro comprising a frame, an enclosure rotatably supported on said frame, said enclosure having a spherical chamber therein, the polar axis of the chamber being coincident with the axis of rotation, a dense fluid filling the chamber to constitute a rotor for the gyro, means to rotate said enclosure and, through viscous drag at the interface between the fluid and the wall of the chamber, to rotate the rotor, a member positioned at the center of the chamber, strut means extending essentially in the equatorial plane of the chamber secured at the inner end to said member, a pair of diametrically-opposite resilient elements respectively secured to the wall of the enclosure, the outer end of said strut means being respectively secured to individual ones of said elements, a piezoelectric crystal bar affixed at its center to said member, an element secured to each end of said bar, said element having an extended surface area for reaction against the rotor during its displacement from a normal spin axis, said area being so selected as to provide maximum safe deflection of the bar upon maximum displacement of the rotor, and circuit means for feeding the voltage generated by the crystal bar upon displacement thereof to means utilizing said voltage in accordance with the magnitude and phase thereof.

11. A rate gyro comprising a frame, a member rotatably supported on said frame, means to rotate said member, an enclosure, means connecting said enclosure to said member for rotation therewith, said connecting means comprising a pair of axially resilient elements, said enclosure having a spherical chamber therewithin, said chamber being filled with a dense fluid to constitute the gyro rotor, said rotor, through viscous drag at the interface between the rotor and chamber wall, being rotated jointly with the enclosure, means mounted on the enclosure to sense displacement of the frame, means mounted on the enclosure to translate movement of said displacement-sensing means into an electrical voltage, resolver means to receive said voltage and to convert the same into a useful signal having a phase and magnitude representing the direction and magnitude of the frame-displacing force.

12. A rate gyro comprising a frame, an enclosure rotatably supported on said frame, means to rotate said enclosure, said enclosure having a spherical chamber therewithin, said chamber being filled with a dense fluid to constitute the gyro rotor, said rotor being rotatable with the enclosure by reason of the viscous drag at the interface between the fluid and chamber wall, means within said chamber to sense displacement of the rotor relative to the enclosure upon displacement of the enclosure, means to translate movement of said sensing means into an electrical voltage, means supporting said sensing means relative to the enclosure comprising radially-positioned members secured at one end to the sensing means, resilient means secured to the enclosure, said radially-positioned members being secured at the other end to said resilient means, said resilient means being characterized to neutralize the sensing means to environmentally-induced shock and vibration.

13. The combination in accordance with claim 1 further characterized by the provision of an expansion chamber carried by the enclosure and passage means providing fluid communication between both said chambers.

References Cited

UNITED STATES PATENTS

| | | | |
|---|---|---|---|
| 2,949,784 | 8/1960 | Maeder | 74—5.7 |
| 3,083,578 | 4/1963 | Rosato et al. | 74—5.6 X |
| 3,142,991 | 8/1964 | Pittman | 74—5.6 X |

FRED C. MATTERN, JR., *Primary Examiner.*

C. J. HUSAR, J. D. PUFFER, *Assistant Examiners.*